United States Patent [19]
Dong et al.

[11] Patent Number: 5,516,492
[45] Date of Patent: May 14, 1996

[54] APPARATUS AND METHOD FOR THE PHOTOPROMOTED CATALYZED DEGRADATION OF COMPOUNDS IN A FLUID STREAM

[75] Inventors: Junchang Dong, Brookline; Elliot Berman, Quincy, both of Mass.

[73] Assignee: ClearFlow Inc., Boulder, Colo.

[21] Appl. No.: 907,692

[22] Filed: Jun. 30, 1992

[51] Int. Cl.⁶ .................................................. B01J 19/12
[52] U.S. Cl. .................................. 422/186; 422/186.3
[58] Field of Search .................. 422/186.3, 900, 422/186, 186.06; 204/158.2; 210/748

[56] References Cited

U.S. PATENT DOCUMENTS

| | | | |
|---|---|---|---|
| 3,067,115 | 12/1962 | Clingman, Jr. | 204/154 |
| 3,846,072 | 11/1974 | Patterson | 21/74 R |
| 4,446,236 | 5/1984 | Clyde | 435/287 |
| 4,615,799 | 10/1986 | Mortensen | 210/117 |
| 4,861,484 | 8/1989 | Lichtin et al. | 210/638 |
| 4,863,608 | 9/1989 | Kawai et al. | 210/638 |
| 4,892,712 | 1/1990 | Robertson et al. | 422/186 |
| 4,966,759 | 10/1990 | Robertson et al. | 422/186 |
| 4,980,040 | 12/1990 | Lichtin et al. | 204/157.46 |
| 5,032,241 | 7/1991 | Robertson et al. | 204/157.15 |
| 5,035,784 | 7/1991 | Anderson et al. | 204/158.14 |
| 5,045,288 | 9/1991 | Raupp et al. | 422/186.3 |
| 5,069,885 | 12/1991 | Ritchie | 422/186 |
| 5,130,031 | 7/1992 | Johnston | 210/748 |

OTHER PUBLICATIONS

Al–Ekabi et al., *J. Phys. Chem.*, vol. 92, No. 20, 5726–5731 (1988).
Matthews et al., *J. Phys. Chem.*, vol. 91, 3328–3333 (1987).
Borgarello et al., *Homogeneous and Heterogeneous Photocatalysis*, 673–689 (1986).
Borgarello et al., *La Chimica E L'Industria*, vol. 68, No. 10 (Oct. 1986).
Matthews, *Solar Energy*, vol. 38, No. 6, 405–413 (1987).
Serpone et al., *Solar Energy Materials*, 14, 121–127 (1986).

*Primary Examiner*—Donald P. Walsh
*Assistant Examiner*—Daniel Jenkins
*Attorney, Agent, or Firm*—Nilsson, Wurst and Green

[57] ABSTRACT

In a reactor and process for the photopromoted catalytic decomposition of compounds in a fluid stream, the area of a catalyst support structure and/or the amount of catalyst on the support structure is varied as a function of distance from a light source to enhance quantum efficiency. In a preferred embodiment, the support structure has a surface area per unit of reaction chamber volume which increases with distance from the light source, or the amount of catalyst on the support structure per unit area increases with distance from the light source to maintain the light intensity on the catalyst within a desired range regardless of dispersion and/or absorption effects. In another embodiment, the support structure includes a plurality of curved plates which may, for example, be spherical, cylindrical or helical.

19 Claims, 2 Drawing Sheets

APPARATUS AND METHOD FOR THE PHOTOPROMOTED CATALYZED DEGRADATION OF COMPOUNDS IN A FLUID STREAM

BACKGROUND OF THE INVENTION

The present invention relates to photocatalytic processes and, more particularly, to a reactor and a method for the photopromoted catalyzed degradation of compounds in a fluid stream.

Considerable effort has been expended in recent years toward the development of methods to remove environmentally detrimental compounds from fluid streams. A particularly promising approach is the photopromoted catalyzed degradation of such compounds, as disclosed in Lichtin et al., U.S. Pat. Nos. 4,861,484 and 4,980,040, and Raupp et al., U.S. Pat. No. 5,045,288. Specific reactor structures are disclosed in Matthews et al., *J. Phys. Chem.* 1987, 91, 3328–3333; Robertson et al., U.S. Pat. Nos. 4,892,712, 4,966,759 and 5,032,241; and Anderson et al., U.S. Pat. No. 5,035,784. The specifications of the listed patents and the disclosure of Matthews et al. are incorporated by reference herein for all purposes.

In each of the foregoing systems, a catalyst is distributed uniformly within a reaction chamber. As a result, the intensity of light impinging on the catalyst is a function of distance from the light source. Intensity is very high close to the light source and falls off rapidly with increasing distance due to dispersion and absorption effects. As a result, one portion of the catalyst is exposed to light of extremely high intensity, while another portion is exposed to very little light. The difference in intensity is particularly extreme when high intensity light sources are used to increase the overall efficiency of commercial scale systems.

Unfortunately, the efficiency of photon utilization in photopromoted catalytic processes depends heavily on intensity. Efficiency is generally high at lower intensities and falls off rapidly as intensity increases above that of sunlight (approximately $10^{24}$ photons of actinic light per square meter per hour). Although not bound by any theory, a plausible explanation for this in the context of photooxidation is that the oxidation rate for attack by holes produced by illumination is limited by the transport of the oxidizable material and its oxidized form to and from the solid catalyst. This transport is a diffusion limited process which cannot keep up with the increase in hole production created by increased intensity. The excess holes tend to recombine with available electrons, a photon-wasteful process. Thus, the quantum efficiency of light catalyzed oxidation processes, which is essentially constant at illumination levels equivalent to or less than that of sunlight, varies as the square root of intensity at illumination levels above that of sunlight and varies as the reciprocal of intensity at very high illumination levels.

Accordingly, there is a need for a reactor and a process capable of more efficiently utilizing light in photopromoted catalytic processes.

SUMMARY OF THE INVENTION

The reactor and process of the present invention take full advantage of the kinetics of photopromoted catalytic processes to increase quantum efficiency of a degradation process far beyond that achieved previously. By varying the area of a catalyst support and/or the amount of catalyst on the support as a function of distance from a light source, the amount of light reaching the catalyst is controlled to optimize reaction conditions. Quantum efficiency is maximized at intensities between approximately $10^{19}$ and $10^{24}$ photons of actinic light per square meter per hour and the efficiency generally falls off above this level.

Thus, a reactor for use in the photopromoted catalyzed degradation of compounds in a fluid stream comprises: a light source; a conduit for conducting the fluid stream in optical proximity to the light source, the conduit including a reaction chamber; a solid catalyst; and a structure for supporting the catalyst in a predetermined spatial distribution within the reaction chamber and in contact with the fluid stream so that light from the light source illuminates the catalyst at an intensity within an optimal range for degradation. In a preferred embodiment, the surface area of the supporting structure per unit of reaction chamber volume increases with distance from the light source, and the catalyst is disposed so that it is illuminated at an intensity of between $10^{19}$ and $10^{24}$ photons of actinic light per square meter per hour. In another preferred embodiment, the supporting structure comprises at least one curved plate, which may, for example, be spherical, cylindrical, or helical. In still another embodiment, the catalyst on the supporting structure has a concentration per unit area which increases with distance from the light source.

DESCRIPTION OF THE PREFERRED EMBODIMENTS

The present invention relates to a reactor and a method of operating the reactor to conduct photopromoted catalytic degradation processes of the prior art. Examples of such processes are disclosed in depth in the patents and other publications incorporated by reference in the foregoing section, entitled "Background of the Invention", and will not be repeated here. In each such process, a suitable photoconductive catalyst, such as titanium dioxide, is affixed to the surface of a support structure for absorption of activating radiation and exposure to a fluid containing the material to be decomposed. The shape and location of the support surface(s), as well as the amount of catalyst on the surface(s), are variable in accordance with the present invention to achieve a pattern of light intensity which optimizes the degradation process.

Figure 1:
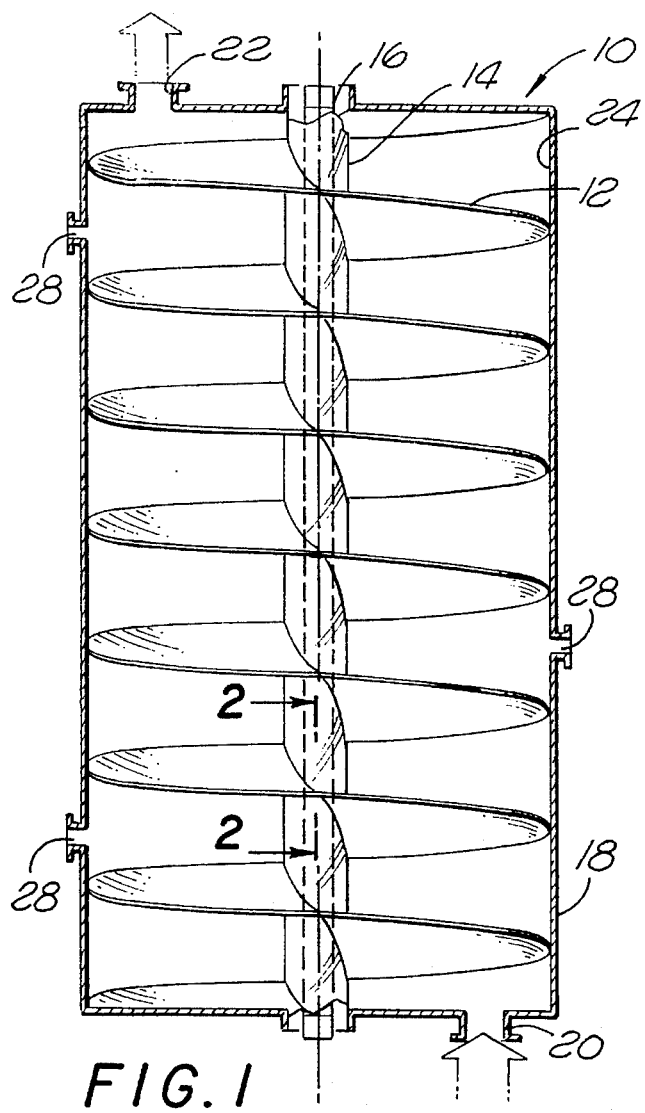
FIG. 1 is a schematic view of a reactor constructed in accordance with a first embodiment of the present invention for the photopromoted catalytic degradation of compounds in a fluid stream, a helical catalyst support of the reactor being shown in elevation with its ends broken away to reveal an axially directed light source, with one of the turns of the support being taken in partial section.
Figure 2:
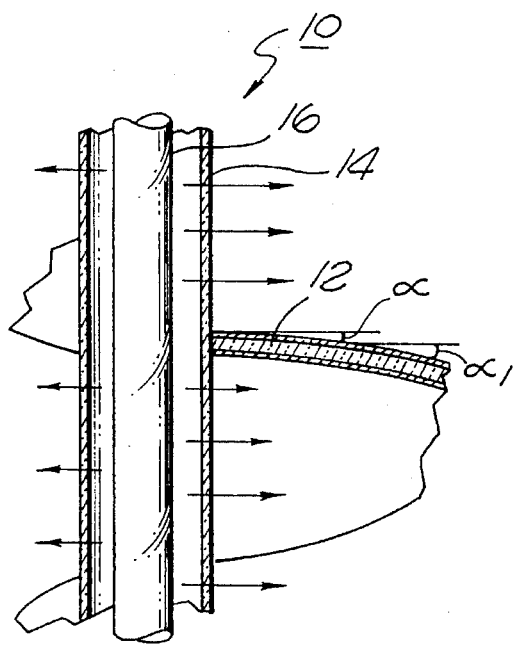
FIG. 2 is a greatly enlarged vertical cross-sectional view taken along the line 2—2 of FIG. 1.

Referring now to the drawings, FIGS. 1 and 2 illustrate a reactor 10 constructed according to a first preferred embodiment of the present invention. The reactor 10 has a helical plate 12 which is coaxial with and disposed about a quartz liner 14 containing a lamp 16. The helical plate 12 and the liner 14 are preferably made as an integral glass unit which is transparent to light and coated with a suitable catalyst, such as titanium dioxide. The helical plate 12 is itself disposed within a shell 18 of the reactor 10 to define a helical path extending from a fluid inlet 20 to a treated fluid outlet 22. As effluent passes along the helical path, undesired components are repeatedly placed in contact with the catalyst on the surfaces of the helical plate 12. At the same time, light emanating from the lamp 16 illuminates the catalyst throughout the reactor 10 at intensities within a preselected range of optimal values for the chemical process to be performed. Thus, the catalyst is activated by the light to an optimal level, maximizing the extent to which undesirable compounds reaching the catalyst are degraded. The extent of the degradation reaction is further promoted by providing catalyst along an inner cylindrical wall 24 of the reactor shell 18.

For a lamp 16 of a given intensity, the amount of light reaching a particular portion of the catalytic coating of the reactor 10 depends on both the inclination angle of the support surface relative to the radiation and its distance from the light source. Both of these variables can be selected in designing the reactor 10 and the other structures disclosed herein to obtain a reduced, yet uniform, intensity distribution over the catalyst support surfaces.

Figure 3A:
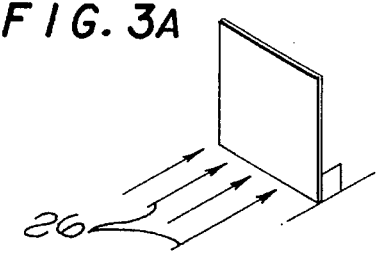
FIGS. 3A and 3B are schematic representations of catalyst support structures on which light is impinging in normal and angular configurations, respectively.
Figure 3B:
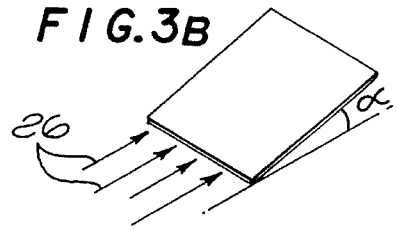

In the helical structure of the reactor 10, the inclination of the helical plate 12 at its innermost point is the angle α by which inner end of the plate deviates from a line perpendicular to the lamp 16. The significance of this relationship is best understood in conjunction with FIGS. 3A and 3B, which illustrate schematically the incidence of incoming radiation 26 at inclination angles of 90° and substantially less than 90°, respectively. In the case of normal incidence (FIG. 3A), the full intensity of incoming radiation is felt at the surface. In all other situations, however, the intensity at the surface is reduced by the sine of the incidence angle, "α". In addition, however, radiation from a point source or a line source drops off in intensity as the distance from the source increases. When the light source is tubular, such as the lamp 16, and the distance between the receiving surface and the bulb is relatively short in comparison to the bulb length, the light source can be treated as an infinitely long source having an intensity defined by the relationship:

$$I = I_0 r^{-1} \sin\alpha.$$

Thus, the intensity (I) at any point within the system of the reactor 10 is reduced by the sine of the inclination angle (α) and drops off as the reciprocal of the distance (r) between the source and the point of concern.

Applying the foregoing to the reactor 10, the intensity at any point along the helical plate 12 is defined by the angle by which the plate deviates from the normal at that location and the distance of the location from the lamp 16. As seen most clearly in FIG. 2, the helical plate 12 of the reactor 10 is actually curved in cross section, causing the angle (α) at which light impinges on the plate to vary as one moves from the liner 14 to the inner shell 18. This causes the angle of incidence to increase from the relatively small angle encountered at the location of the liner 14 to a significantly greater angle, $\alpha_1$, at a more distant location. The curvature thus increases the amount of light intercepted by the catalyst at more distant points on the helical plate, compensating for the fact that light reaching these areas is otherwise reduced by the reciprocal of the distance from the source. The inner cylindrical wall 24 of the shell 18 intercepts all of the light reaching it.

The optical characteristics of the reactor 10 and the quantum efficiency of the photopromoted catalytic reaction, can be controlled using the structure of the reactor 10 by selecting appropriate dimensions and/or curvatures for the various components. Both the area of the catalyst support surface and the characteristics of the fluid flow are affected by the spacing (h) between the individual turns of the helical plate 12 and the radial distance (d) of those turns. The more turns are provided and the larger their radius, the more catalyst area is present to absorb available light. As a general matter, an increase in catalyst surface area lowers the average light intensity on the catalyst itself. In addition, the intensity of light on the catalyst depends heavily on the angle and curvature of the surface of the plate, as described above. The greater the angle of inclination, the more light will be intercepted. Thus, the most preferred form the helical plate 12 is the one depicted in FIGS. 1 and 2, wherein the angle of inclination increases from a relatively small angle (α) near the liner 14 to a much larger angle ($\alpha_1$) further from the liner.

In operation, effluent enters the reactor 10 through the fluid inlet 20 and is forced upwardly along a tortuous path defined by the helical plate 12 and the reactor shell 18. As the effluent travels through the shell 18, it is constantly agitated, causing undesired compounds within it to contact the catalyst coatings on both surfaces of the helical plate 12 and the inner cylindrical wall 24. As this occurs, light emanating from the lamp 16 passes through the liner 14 to impinge upon the catalyst coatings. The intensity of the light on the catalyst-coated surfaces is substantially uniform (or at least falls within an acceptable range of intensity) over the entire reactor structure. This advantageous intensity distribution is determined by the design of the reactor and will not vary.

In this and other embodiments of the present invention, one or more additional apertures can be provided in the reactor side wall to introduce other components, such as oxygen, which may be required in some degradation processes. For this reason, the reactor 10 of FIG. 1 is provided with three auxiliary ports 28.

Figure 4:
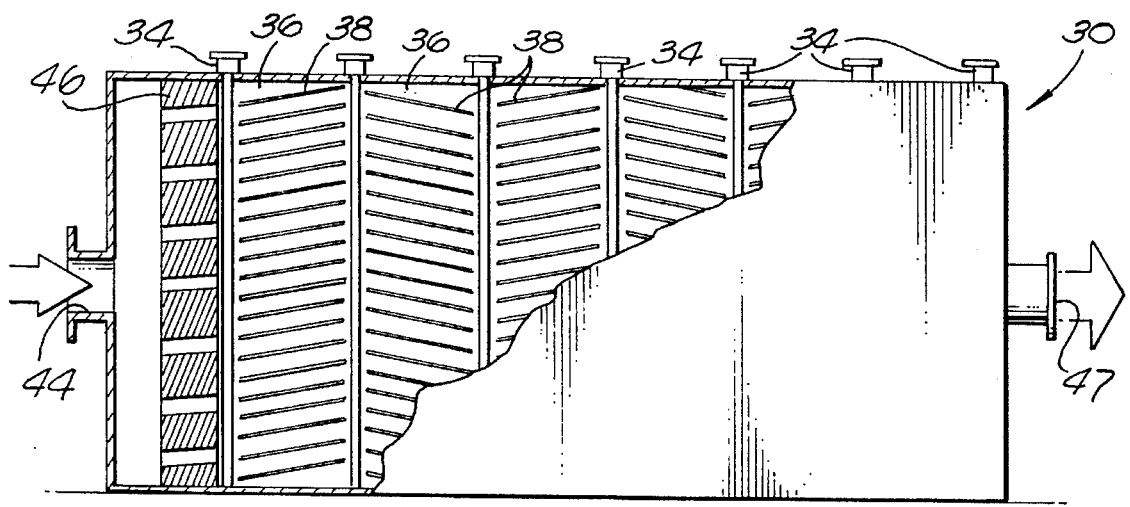
FIG. 4 is a side elevational view of a large scale baffle plate reactor constructed according to another embodiment of the invention, the reactor side wall being broken away to reveal a partial sectional view of the interior.

A reactor structure particularly well-suited for the large scale processing of effluents is illustrated in FIG. 4 and designated 30. The reactor 30 has a shell 32 with a plurality of parallel rows of lamps 34 extending transversely thereof. The rows of lamps 34 separate the reactor into a plurality of chamber regions 36 which contain respective stacks of inclined baffle plates 38 which are spaced apart to allow fluid to flow between the individual plates. The direction of inclination of the baffle plates may be alternated from one chamber region 36 to another, giving the "zigzag" configuration of FIG. 4.

Figure 5:
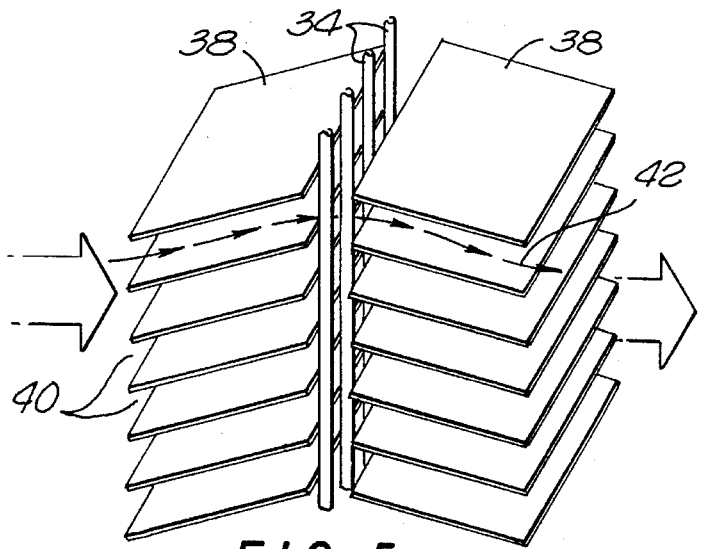
FIG. 5 is a schematic perspective view illustrating the manner of operation of the reactor of FIG. 4.

The operation of the inclined baffle plate structure of the reactor 34 is most easily understood from FIG. 5, which is a perspective schematic view of two adjoining stacks of baffle plates 38 on opposite sides of one of the rows of lamps 34. Thus, the plates 38 of each stack are separated by spaces 40 permitting fluid flow therebetween. As depicted at 42, fluid initially rises as it passes through the spaces 40 of a first stack of plates 38, passes between the lamps 34, and then descends through the spaces of the next stack of inclined plates. As the flow takes place, light emanating from the lamps 34 intercepts the catalyst coatings on the inclined plates 38 to illuminate the coatings at an intensity proportional to the sine of the inclination angle.

When the inclined plates 38 are substantially flat, as illustrated in FIGS. 4 and 5, the maximum intensity from each individual lamp falls off with the reciprocal of the distance from the lamp. This effect is minimized, however, by the use of several lamps in a row and the fact that each stack of inclined plates is illuminated by at least two rows of lamps, one on each side of the stack. In many cases, this configuration of flat plates is sufficient to maintain intensity within the relatively narrow optimal range for photopromoted catalytic degradation processes. It is, of course, possible to control the intensity even more carefully in such an apparatus by curving the plates 38 to counteract the drop-off of intensity with distance.

Returning now to FIG. 4, fluid enters the reactor 30 through a fluid inlet 44, passes through a perforated plate 46 which acts as a manifold to distribute the flow, and then passes through the zigzag network of passages created by the alternating stacks of baffle plates 38. During this time, the effluent is constantly agitated so that compounds within it come in contact with the catalyst for degradation. By the time the effluent passes through the reactor 30, essentially all of the harmful compounds are degraded, leaving only environmentally compatible products. The resulting effluent exits the reactor 30 at a treated fluid outlet 46.

Figure 6B:
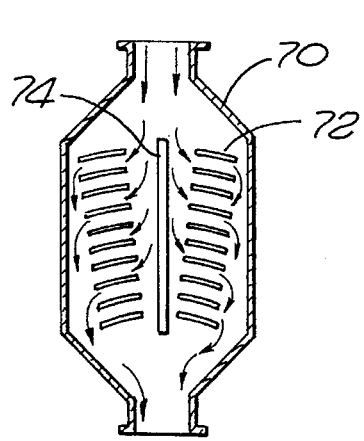
FIGS. 6A and 6B are vertical sectional views of reactors having cylindrical and spherical baffle plates, respectively, which extend transversely to a linear light source and spaced therealong.
Figure 6A:
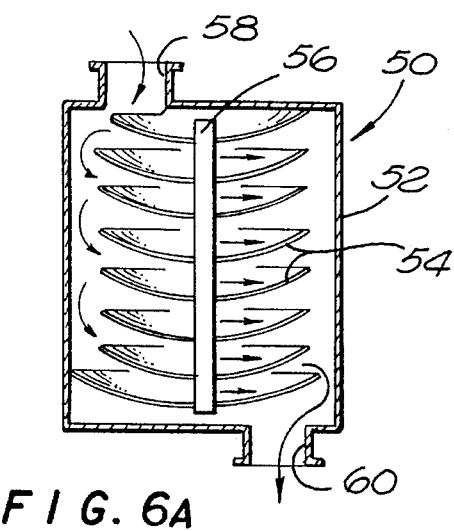

Turning now to FIG. 6A, a reactor 50 has a shell 52 containing a plurality of spaced, cylindrically-curved baffles 54 illuminated by one or more lamps 56. Effluent enters through a fluid inlet 58, passes horizontally between baffle plates 54, and exits through a treated fluid outlet 60 at the bottom of the reactor. The lamp(s) 56 pass through openings in the baffle plates 54 to illuminate a solid catalyst affixed to the surfaces of the plates. It has been found that the cylindrical curvature of the baffle plates 54, when arranged transversely relative to the lamp(s) 56 in the manner shown, produces a roughly uniform intensity distribution over the surfaces of the plates. This is because the portions of the baffle plates 54 nearest to the lamp 56 are inclined only slightly and do not intercept a large portion of the light. At greater distances, however, the inclination increases rapidly, vastly improving the ability of the baffle plates to intercept light. The larger angle of inclination increases the amount of radiation intercepted by a factor (Sin $\alpha$) which tends to counteract the drop-off from the tubular light source at greater distances.

FIG. 6B illustrates a reactor 70 which is similar in structure to the reactor 50, but has spherically-curved baffle plates 72 in place of cylindrically-curved plates. When illumination is provided by a single tubular lamp 74 passing centrally through the baffle plates 72, the distribution of light intensity on the catalyst-coated surfaces of the baffle plates is even more uniform. When the baffle plates 72 are curved to a radius R, the intensity of the irradiation is approximated by:

$$I = I_0 r_0 / R, \text{ where } r_0 \text{ is the radius of the lamp.}$$

The baffle plates of the reactor 30, 50 and 70 can, in some instances, be made of porous glass which has a higher surface area than conventional glass and has the added advantage of enhancing fluid flow. Such glass can be manufactured by known methods to have a large number of very small pores, or can be formed by creating discrete holes in otherwise nonporous glass.

Figure 7B:
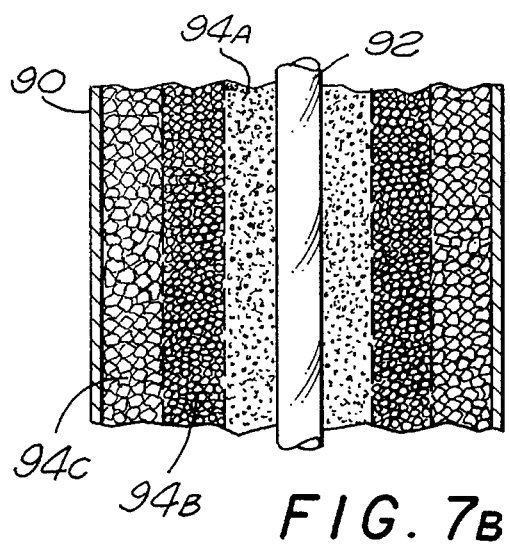
FIGS. 7A and 7B are fragmentary vertical cross-sectional views of tubular reactors constructed according to other preferred embodiments of the present invention.
Figure 7A:
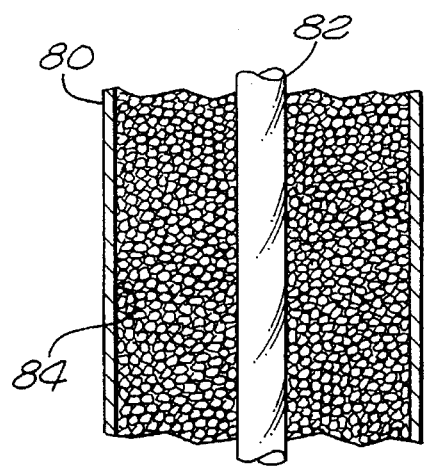

Perhaps the simplest reactors embodying the teachings of the present invention are those of FIGS. 7A and 7B. FIG. 7A illustrates a reactor 80 made of a single tubular shell disposed about a lamp 82 to define an annular core which is either empty or is packed uniformly with a catalyst-coated structure allowing fluid to pass through it. Both the exterior of any packing material and the interior surface 84 of the shell 80 are coated with catalyst for activation by light from the lamp 82. Effluent passing through the annular space between the lamp 82 and the reactor shell 80 is therefore fully reacted by exposure to the light-activated catalyst. Although the basic structure of the reactor 80 does not differ greatly from some prior art reactors, its dimensions, and therefore the intensity of light incident on the catalyst, are quite different. Whereas tubular reactors of the prior art have typically operated at light intensities far greater than 1 sun on the catalyst surface, the tubular shell of the reactor 80 is large enough to bring the intensity of light on the catalyst down to a level well within the optimum of $10^{19}$–$10^{24}$ photons of actinic light per square meter per hour.

FIG. 7B illustrates a reactor 90 which is similar to the reactor 80 but differs in that the surface area supporting the catalyst and/or the concentration of the catalyst on the support structure vary spatially relative to an axial lamp 92. The reactor 90 is provided with three annular zones of catalyst support media, designated 94A, 94B and 94C, respectively. As light traverses the radial distance from zone 94A to zone 94C, the amount of support area and/or the concentration of catalyst on the support area progressively increase. The support media themselves can be discrete elements, such as glass beads, toroidal elements or saddle elements, or can be interconnected structures, such as a fabric made of glass or other suitable fibers. In the case of a fabric or mat structure, variations in surface area can be accomplished either by altering the weave of the fabric or by altering the dimensions of the fibers from which the fabric is made. On the other hand, the only difference may be the amount of catalyst affixed to each fiber.

In each of the foregoing structures, a suitable catalyst is preferably supported both on the inner wall of a reactor housing and on a surface element disposed within the reactor housing. Also, in order to maximize the absorption of light by the catalyst, it is desirable to form the support structures of glass, pyrex or other transparent material. Borosilicate glass is suitable for these purposes in connection with many common catalytic processes.

From the above, it can be seen that the reactor and method of the present invention considerably improve the efficiency of photon utilization in many photopromoted catalytic processes.

While certain specific embodiments of the invention have been disclosed as typical, the invention is not limited to these particular forms, but rather is applicable broadly to all such variations as fall within the scope of the appended claims. For example, the disclosed reactor structures and methods are suitable for use with virtually any fluid stream, whether liquid or gaseous.

What is claimed is:

1. A reactor for use in the photopromoted catalyzed degradation of compounds in a fluid stream, comprising:

a light source;

a conduit for directing said fluid stream into optical proximity to the light source, said conduit defining a reaction chamber;

a solid catalyst; and a structure for supporting the catalyst in a predetermined spatial distribution within said reaction chamber and in contact with said fluid stream so that light from the light source illuminates the catalyst at an intensity within a preselected range for degradation of said compounds;

said catalyst having a surface concentration on said supporting structure which increases with distance from the light source.

2. The reactor of claim 1 wherein:

said spatial distribution is selected so that the catalyst is illuminated at an intensity of between $10^{19}$ and $10^{24}$ photons of actinic light per square meter per hour.

3. The reactor of claim 1 wherein:

the supporting structure defines a catalyst support surface having a surface area per unit of reaction chamber volume which increases with distance from the light source.

4. The reactor of claim 3 wherein:

said surface area per unit of reaction chamber volume increases in proportion to the distance from the light source.

5. The reactor of claim 3 wherein:

the supporting structure comprises at least one curved plate.

6. The reactor of claim 5 wherein:

said at least one curved plate is spherical.

7. The reactor of claim 5 wherein:

said at least one curved plate is cylindrical.

8. The reactor of claim 5 wherein:

said at least one curved plate is helical.

9. The reactor of claim 3 wherein:

the supporting structure comprises a plurality of curved plates.

10. The reactor of claim 3 wherein:

the supporting structure comprises a plurality of discrete support elements of different surface areas at different distances from the light source.

11. The reactor of claim 3 wherein:

the supporting structure comprises a plurality of fabric elements of different surface areas at different distances from the light source.

12. The reactor of claim 11 wherein:

said fabric elements at different distances from the light source have different weaves.

13. The reactor of claim 11 wherein:

said fabric elements at different distances from the light source have different thread diameters.

14. The reactor of claim 1 wherein:

said catalyst has a concentration per unit of reaction chamber volume which increases with distance from the light source.

15. The reactor of claim 14 wherein:

said concentration per unit of reaction chamber volume increases in proportion to the distance from the light source.

16. A reactor for use in the photopromoted catalyzed degradation of compounds in a fluid stream, comprising:

a light source;

a conduit for directing said fluid stream into optical proximity to the light source, said conduit defining a reaction chamber;

means for producing turbulent flow within said reaction chamber;

a solid catalyst; and a structure for supporting the catalyst in a predetermined spatial distribution within said reaction chamber and in contact with said fluid stream so that light from the light source illuminates the catalyst at an intensity within preselected range for degradation of said compounds;

said catalyst having a surface concentration on said a supporting structure which increases with distance from the light source.

17. A method of fabricating a reactor for use in the photopromoted catalyzed degradation of compounds in a fluid stream, comprising:

providing a light source;

providing at least one conduit to direct said fluid stream into optical proximity to the light source, said conduit defining a reaction chamber;

disposing a solid catalyst on a supporting structure within said reaction chamber in contact with said fluid stream, at a surface concentration which increases with distance from the light source so that light from the light source illuminates the catalyst at an intensity within a preselected range for degradation of said compounds.

18. The method of claim 17 wherein:

said surface concentration is selected so that the catalyst is illuminated at an intensity of between $10^{19}$ and $10^{24}$ photons per square meter per hour.

19. The method of claim 17 wherein:

the step of disposing a solid catalyst on a supporting structure within said reaction chamber comprises providing a catalyst support surface having a surface area per unit of reaction chamber volume which increases with distance from the light source.

* * * * *